United States Patent
Pradel

[19]

[11] Patent Number: 6,076,794
[45] Date of Patent: Jun. 20, 2000

[54] ARRANGEMENT FOR SECURITY AGAINST ROTATION OF A STRUCTURAL COMPONENT OF A SHOCK ABSORBER

[75] Inventor: Robert Pradel, Heidenfeld, Germany

[73] Assignee: Mannesmann Sachs AG, Schweinfurt, Germany

[21] Appl. No.: 08/974,631

[22] Filed: Nov. 19, 1997

[30] Foreign Application Priority Data

Nov. 28, 1996 [DE] Germany .............................. 196 49 246

[51] Int. Cl.⁷ .................................................. F16M 13/00
[52] U.S. Cl. .......................... 248/562; 248/636; 267/220
[58] Field of Search ................................ 248/550, 562, 248/609, 647, 632, 638, 636; 267/220, 140

[56] References Cited

U.S. PATENT DOCUMENTS

| | | | |
|---|---|---|---|
| 2,708,560 | 5/1955 | Paley | 248/632 |
| 5,330,166 | 7/1994 | Aoki | 267/220 |
| 5,456,454 | 10/1995 | Schulz et al. | 267/220 |

*Primary Examiner*—Ramon O. Ramirez
*Assistant Examiner*—Tan Le
*Attorney, Agent, or Firm*—Cohen, Pontani, Lieberman & Pavane

[57] ABSTRACT

An arrangment for securing against rotation for a structural component part of a vibration damper or of a shock absorber leg for motor vehicles, which structural component part is provided with a pin type pivot bearing. A piston rod and/or a receptacle is connected, in each instance via a flexible pin type pivot bearing, with the vehicle body or with a wheel guide part. The arrangement for securing against rotation acts between the piston rod and/or the receptacle and the part which is fixed with respect to the vehicle and connected therewith. The arrangement for securing against rotation is formed by a flexible structural component part which participates in the articulated movements and is arranged so as to be positioned between the piston rod and/or the receptacle or cylinder and the part which is fixed with respect to the vehicle.

3 Claims, 6 Drawing Sheets

ARRANGEMENT FOR SECURITY AGAINST ROTATION OF A STRUCTURAL COMPONENT OF A SHOCK ABSORBER

BACKGROUND OF THE INVENTION

1. Field of the Invention

The invention is directed to an arrangment for securing against rotation in a structural component part of a hydraulic, hydropneumatic or pneumatic unit, especially of a vibration damper or of a shock absorber leg for motor vehicles, which structural component part is provided with a pin type pivot bearing. The piston rod and/or a receptacle is connected, in each instance via a preferably flexible or elastic pin type pivot bearing, with the vehicle body or with a wheel guide part. The arrangment for securing against rotation acts between the piston rod and/or the receptacle and the vehicle part connected therewith.

2. Description of the Related Art

Such arrangements for securing against rotation are required in vibration dampers or shock absorber legs which are connected with the vehicle by means of pin type pivot bearings when the structural component parts of the vibration damper or the structural component parts of the shock absorber leg that are provided with external connections must occupy an exact installation position so that connection lines for damping force adjustment or for level regulation are not damaged. An arrangement for securing against rotation must also be provided for units that are provided with a magnet body of a magnetic switch in order to ensure trouble-free operation. Also, for the purpose of regulation of running gear or for an arrangement for monitoring quantities relating to driving safety in motor vehicles, sensors are frequently arranged in the parts of the vibration damper and shock absorber leg that move relative to one another and that require arrangements for securing the piston rod and receptacle relative to rotation, especially in the case of slightly pretensioned pin type pivot bearings, so as to prevent misadjustment of or damage to the sensing equipment.

Known articulated eyes or lugs are often used in vibration dampers as pivot bearings which are fixed with respect to relative rotation. Also known in ball-and-socket joints are arrangements for securing against rotation between the ball pivot and the joint socket. Such arrangements comprise a pin which is connected with the joint socket and which engages in a groove of the ball pivot.

SUMMARY OF THE INVENTION

The object of the present invention is to provide an arrangement for securing against rotation in a flexible or elastic pin type pivot bearing of a hydraulic, hydropneumatic or pneumatic unit, which arrangement is constructed simply and economically, precisely maintain a predetermined position, and exclude subsequent rotation of the structural component part when inexpertly installed in the vehicle, so that the installation can also be carried out by a non-professional. Further, the arrangment for securing against rotation should not, or at least not noticeably, impair the movements of the pin type pivot bearing.

Pursuant to this object, and others which will become apparent hereafter, one aspect of the present invention resides in an arrangement for securing against rotation that is formed by a flexible structural component part which participates in the articulated movements and is arranged so as to be positioned between the piston rod and/or the receptacle or cylinder and a part which is fixed with respect to the vehicle. The positioning of the arrangement for securing against rotation ensures correctly positioned installation, wherein, as a result of the elasticity of the arrangement for securing against rotation, a slight rotation of the structural component parts relative to one another activates a restoring moment or restoring torque, so that the exact position is produced automatically. Thus, no specialized knowledge is required for installing the unit. The flexible structural component part can be produced economically and also causes no hindrance, or at least no perceptible hindrance, of the movements of the pin type pivot bearing when installed with pretensioning.

In another embodiment of the invention, the flexible structural component part is formed by an articulated rubber element which is connected, on the one hand, with a part that is fixed with respect to the vehicle and, on the other hand, with the piston rod or the receptacle or cylinder so as to be fixed with respect to rotation relative thereto. In this way, a simple construction of the arrangement for securing against rotation is provided, wherein the articulated rubber element performs a two-fold function, namely, that of flexible bearing part and means for securing against rotation. The connection of the articulated rubber element with the piston such that it is fixed with respect to rotation relative thereto is produced in a very simple manner in that the articulated rubber element is fixedly connected with a cover plate or cover disk, and the cover disk has a profile which engages in a corresponding complementary profile of the articulated pin or pivot pin. The connection of the articulated rubber element with the cover disk is preferably effected by vulcanization, but other types of connection are also possible, e.g., a glue connection or a positive-locking connection. According to the invention, the articulated rubber element is connected directly with the pivot pin in a positive engagement and so as to be fixed with respect to rotation relative to it in that the pivot pin has an axially extending profile in which a corresponding complementary profile of the articulated rubber element engages. For example, a profile sleeve forming a positive-locking connection with the articulated rubber element can be attached to the pivot pin.

According to a further embodiment of the invention, the articulated rubber element is connected with the part that is fixed with respect to the vehicle so that the articulated rubber element is fixed with respect to rotation relative to the latter in that there is a positive engagement between an articulated cup or pivot cup and the articulated rubber element. This positive engagement is formed, for example, by an inner polygon of the pivot cup and an outer polygon of the articulated rubber element which engages therein in an exact fit.

In another embodiment, the flexible structural component part engages, on the one hand, in a recess or key face which is preferably arranged in the piston rod or in the pivot pin and, on the other had, snaps into at least one opening of the part which is fixed with respect to the vehicle such that it is pretensioned axially.

According to the invention, the flexible structural component part can comprise a molded part of spring-steel plate or spring-steel sheet which is provided, at the outer circumference, with at least one projection engaging in the opening of the part that is fixed with respect to the vehicle. In another embodiment form, the flexible structural component part is formed in a simple manner by a three-dimensionally or spatially wound spring-steel wire which is connected, on the one hand, with the piston rod so as to be fixed with respect to rotation relative to it and is connected, on the other hand, with the part which is fixed with respect to the vehicle such that it is fixed with respect to rotation relative to the latter.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PRESENTLY PREFERRED EMBODIMENTS

The arrangement for securing against rotation is provided particularly for pistoncylinder units which are connected with a vehicle in a flexible manner by means of pin joints, wherein the connection lines leading to the unit may not be damaged and the sensors arranged in the unit may not be misaligned or misadjusted. Regarding the cooperation of sensors which are fixed with respect to the vehicle with sensors which are attached to the unit, it is also required that the unit parts are supported so as to be fixed with respect to rotation.

Figure 1:
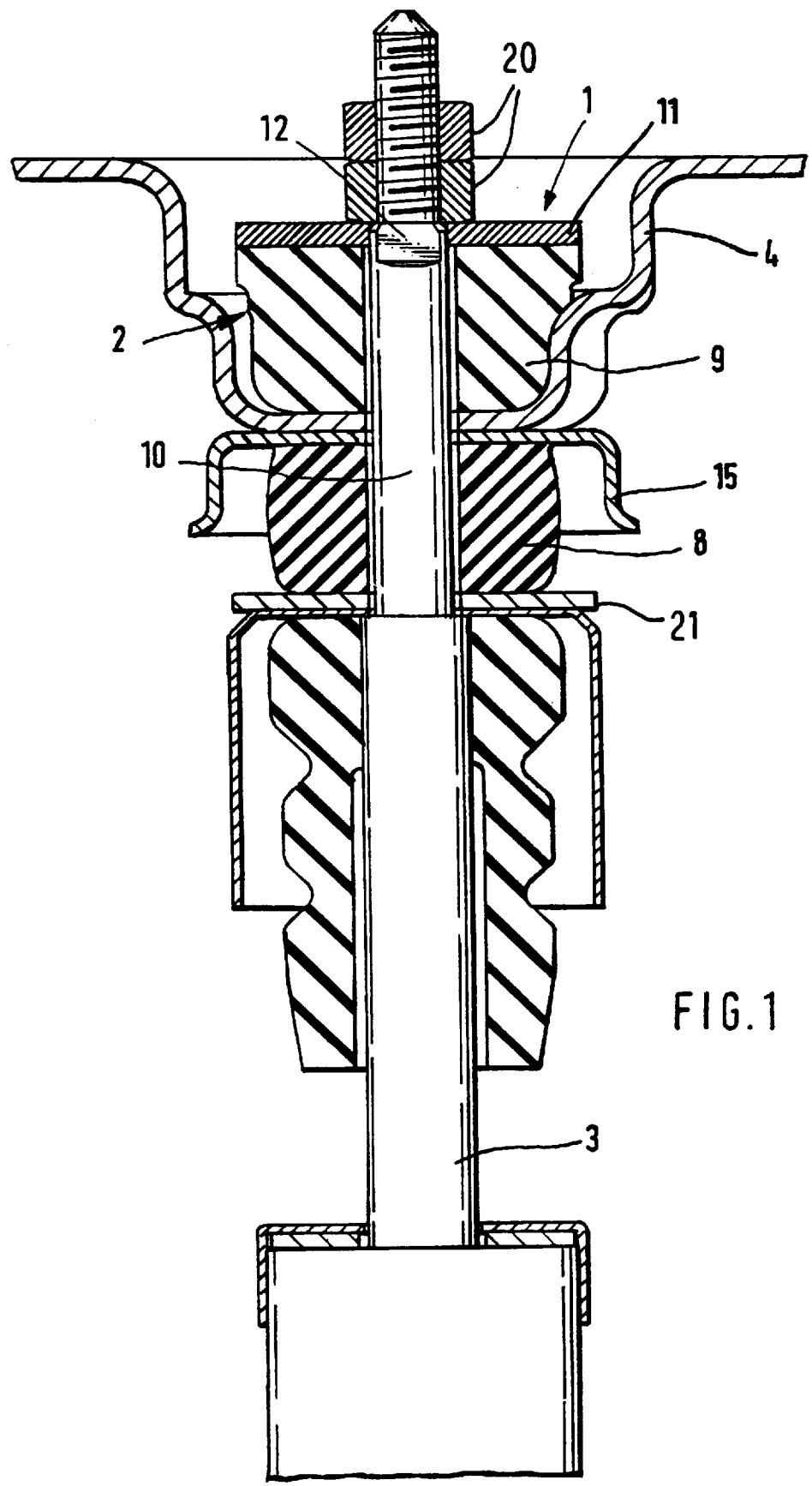
FIG. 1 shows an arrangment for securing against rotation pursuant to the present invention in which the articulated rubber element is a structural component part of the arrangement for securing against rotation.

In FIG. 1, the arrangement for securing against rotation 1, arranged between a piston rod 3 and a part 4 that is fixed with respect to the vehicle, is formed by a articulated rubber element 9 which is fixedly connected with a cover disk 11, wherein this connection is produced by vulcanizing, gluing or positive engagement, etc. The cover disk 11 is provided in its center with a profile which engages in a corresponding complementary profile 12 of a pin 10 of the piston rod 3 and accordingly forms the connection with the piston rod 3 such that it is fixed with respect to rotation relative to the piston rod 3. At the outer circumference, the articulated rubber element 9 is connected with the part 4 that is fixed to the vehicle so that the articulated rubber element 9 is fixed with respect to rotation relative thereto, preferably by means of a positive engagement or by vulcanizing. The articulated rubber element 9 accordingly forms a part of the flexible bearing as well as the flexible structural component part 2 for fixing the piston rod 3 in the part 4 that is fixed with respect to the vehicle such that the piston rod 3 is fixed with respect to rotation relative thereto. The part 4 that is fixed with respect to the vehicle is normally connected with the vehicle body by at least two screws.

The flexible pin type pivot bearing between the piston rod 3 of a vibration damper or of a shock absorber leg and the part 4 that is fixed with respect to the vehicle is formed by an articulated rubber element 8 and the articulated rubber element 9. One side of the articulated rubber element 8 is supported on a stop plate 21 which rests on an end face of the piston rod 3. The end face is located at the transition between the piston rod 3 and the pivot pin 10. On the other end side, the articulated rubber element 8 contacts a pivot cup 15 which, in turn, acts on the end face of the part 4 that is fixed with respect to the vehicle, while the articulated rubber element 9 connected with the cover disk 11 acts on the inner face of the fixed part 4. The rubber elements 8, 9 are pretensioned by the two nuts which act as locking nuts 20 which are screwed onto the thread at the end of the pivot pin 10, so that no articulation noise can be generated during operation.

Figure 2:
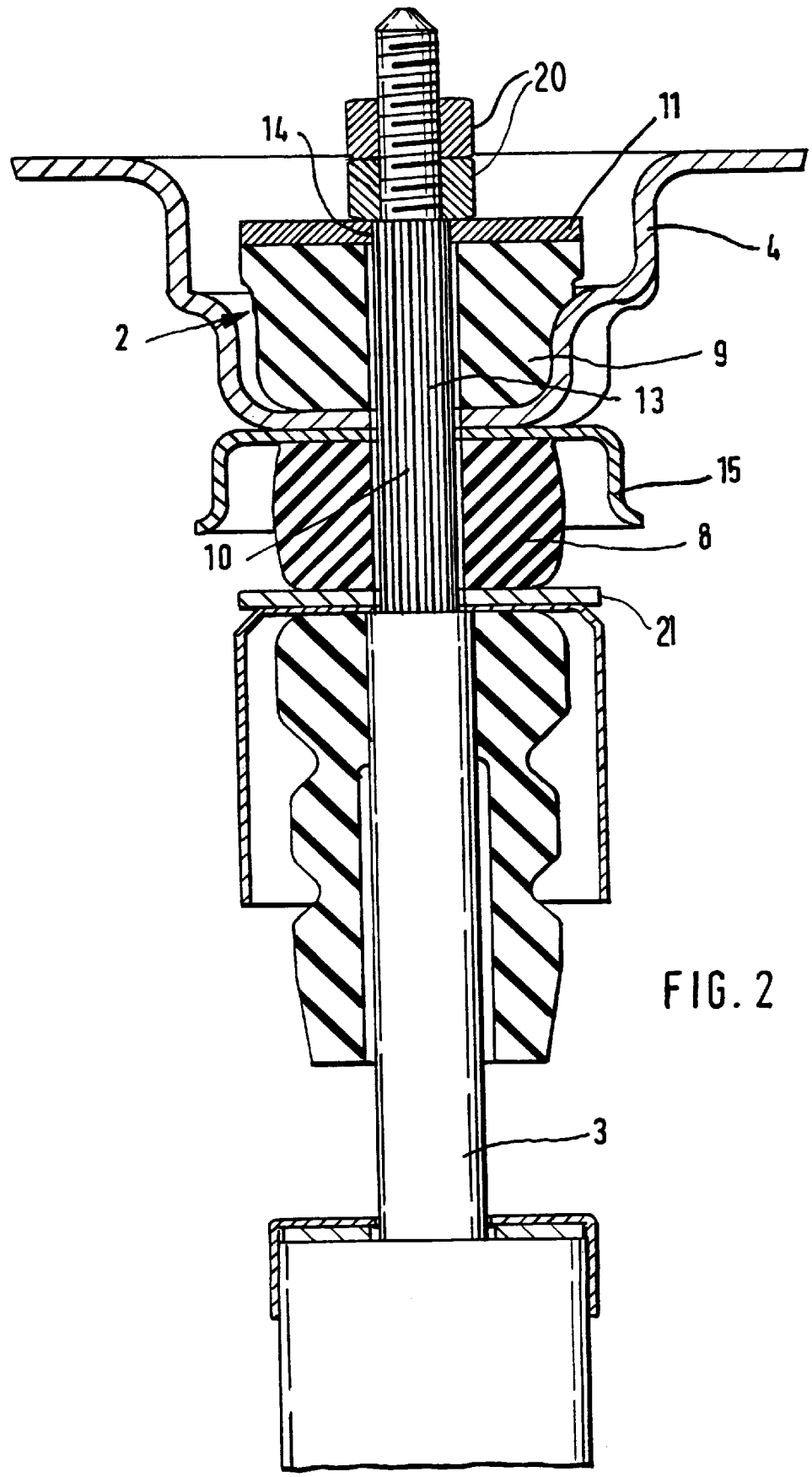
FIG. 2 shows an embodiment in which the pivot pin is provided with an axially extending profile.

The embodiment form shown in FIG. 2 differs from that according to FIG. 1 in that the pivot pin 10 of the piston rod 3 has an axially extending profile 13 in which a corresponding recess 14 of the cover disk 11 and/or of the articulated rubber element 9 engages. The axially extending profile 13 can also be formed, for example, by a sleeve which is fixedly connected with the pivot pin 10 and which has links or drivers with a relatively large radial extension. The pin type pivot bearing corresponds to the construction according to FIG. 1, wherein the reference number also corresponds to that in FIG. 1.

Figure 3:
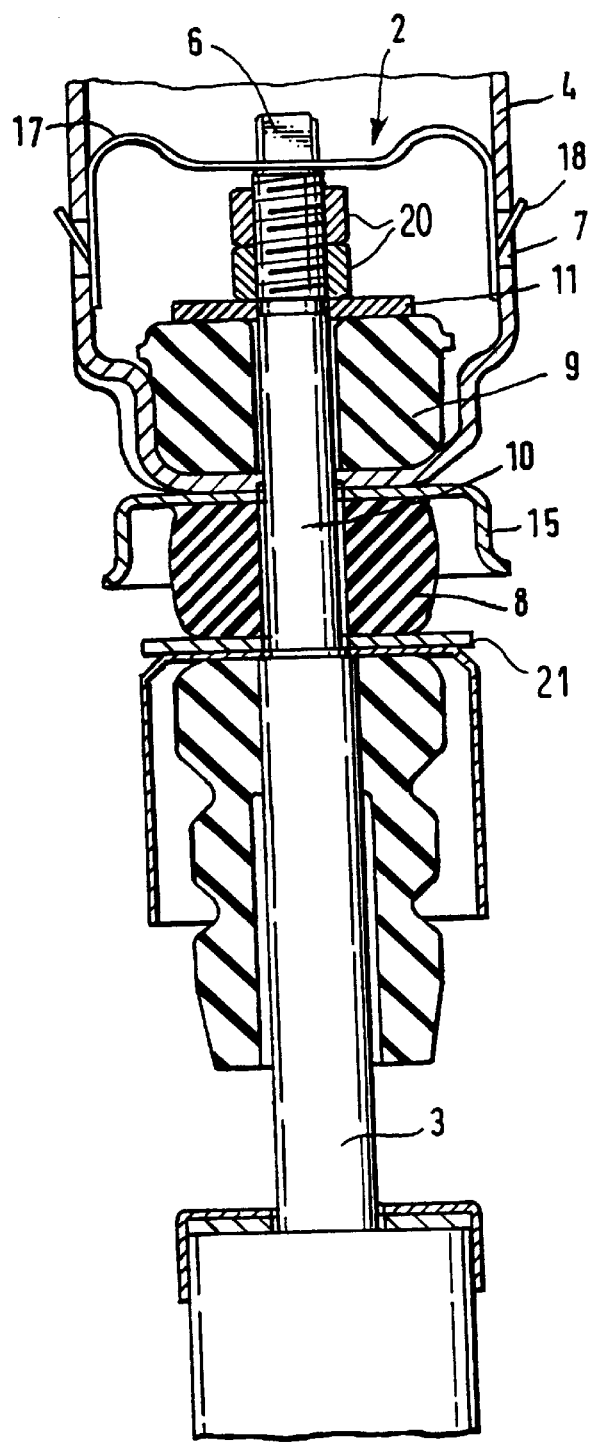
FIG. 3 shows an arrangement for securing against rotation which is formed by a molded part made of sheet spring-steel.
Figure 4:
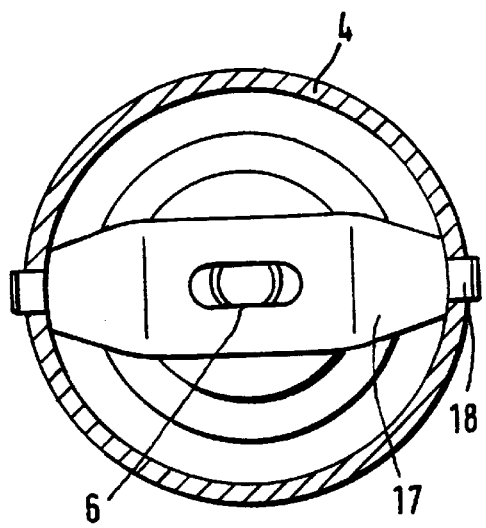
FIG. 4 is a top view showing the arrangement for securing against rotation according to FIG. 3.

FIGS. 3 and 4 show another embodiment in which the flexible structural component part 2 is formed by a molded spring-steel part 17. The molded spring-steel part 17 has a central recess that engages a key face 6 arranged at the free end of the joint pin 10, wherein the recess is adapted to the shape of the key face, thereby forming a connection of the molded spring-steel part 17 with the piston rod 3 so that the molded spring-steel part 17 is fixed with respect to rotation relative thereto. The two oppositely located arms of the molded spring-steel part 17 extend at the outer circumference in the axial direction of the piston rod 3 and contact the inner surface of the part 4 that is fixed with respect to the vehicle. Projections 18 of the molded spring-steel part 17 engage in openings 7 of the part 4 that is fixed with respect to the vehicle, so as to form a connection between the molded spring-steel part 17 and the part 4 that is fixed with respect to the vehicle such that the molded spring-steel part 17 is fixed with respect to rotation relative thereto. The molded spring-steel part 17 is installed so as to be pretensioned axially so that it is pressed centrally against the end face formed by the pivot pin 10 and the projections 18 firmly contact the upper edge of the openings 7 during movements of the pin type pivot bearing. This produces an arrangement for securing against rotation which act elastically during all bearing movements and which does not produce noise. The flexible pin type pivot bearing is constructed and designated as described with reference to FIG. 1, wherein the articulated rubber element 9 is only pretensioned relative to the cover disk 11 and thus need not assume the function of securing against rotation.

Figure 5:
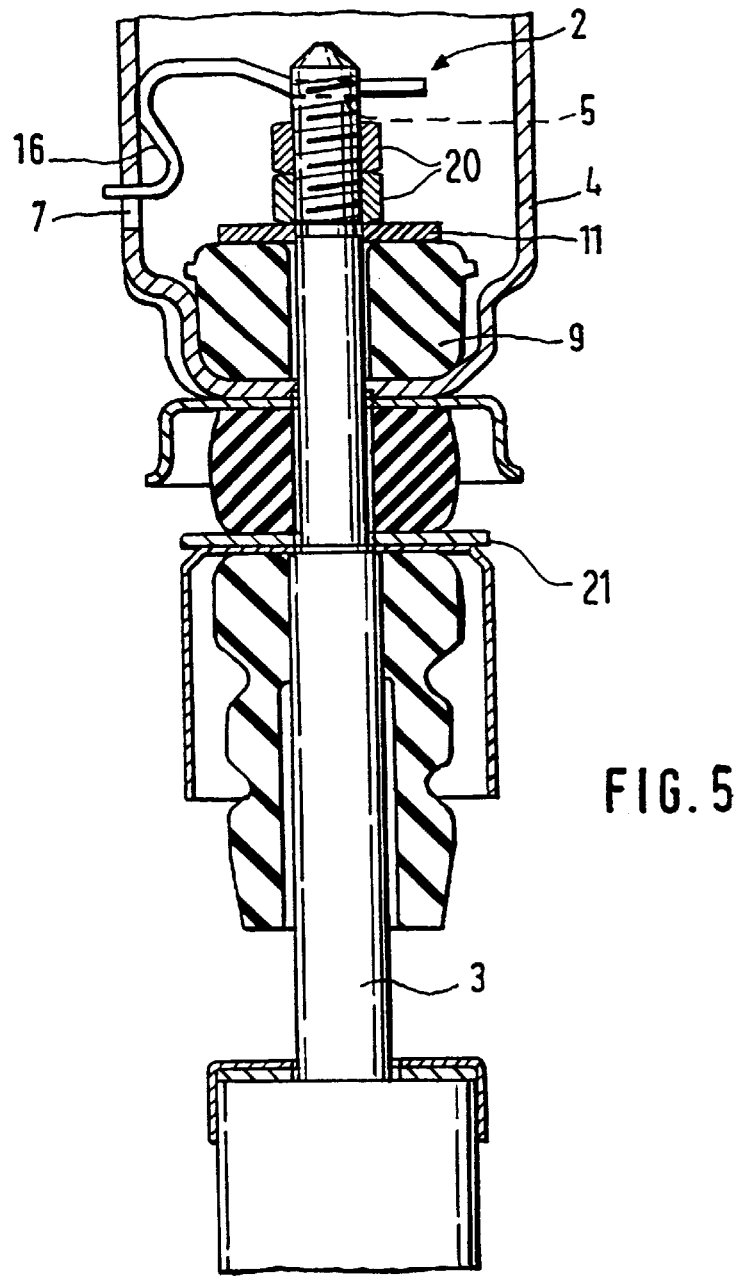
FIG. 5 shows an arrangement for securing against rotation which is formed of a spatially wound spring-steel wire.
Figure 6:
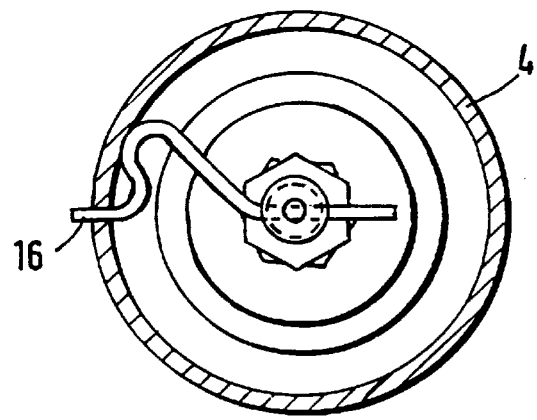
FIG. 6 is a top view of FIG. 5.

FIGS. 5 and 6 show an arrangement for securing against rotation forms by a spatially wound spring-steel wire 16. This spring-steel wire 16 forms the flexible structural component part 2 and is connected, on the one hand, with the piston rod 3 by inserting the wire into a recess 5 formed by a bore hole in the pin 10. The other end of the spring-steel wire 16 engages in the opening 7 of the part 4 that is fixed with respect to the vehicle. This flexible structural component part 2 is also axially pretensioned and contacts the upper edge of the opening 7 during every joint movement.

Figure 7:
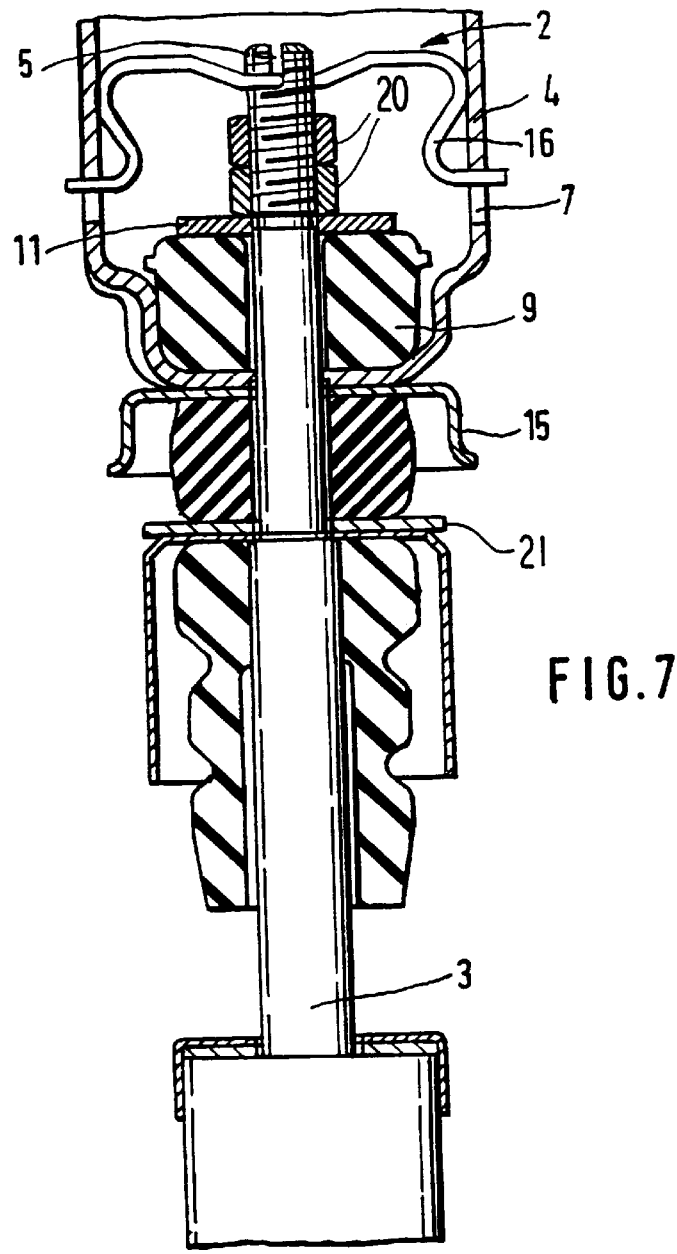
FIG. 7 shows an arrangement for securing against rotation which is formed of spring-steel wire and acts on two sides.
Figure 8:
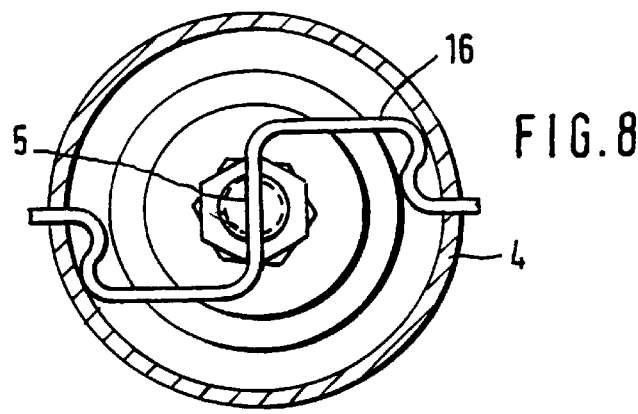
FIG. 8 is a top view of FIG. 7.

In another embodiment of the arrangment for securing against rotation, which participates elastically in joint movements, a two-armed spatially wound spring-steel wire 16 is installed between the piston rod 3 and the part 4 that is fixed with respect to the vehicle, as shown in FIGS. 7 and 8. The connection with the piston rod 3 is effected in that the spring-steel wire 16 is introduced centrally into the recess 5 which is formed by a slot in the top of the pin 10. The free outer ends of the two-armed spring-steel wire 16 engage in the openings 7 of the part 4 that is fixed with respect to the vehicle so as to produce the connection of the piston rod 3 with the part 4 that is fixed with respect to the vehicle so that the piston rod 3 is fixed with respect to rotation relative thereto. This flexible structural component part 2 is also axially pretensioned so that the spatially wound spring-steel wire 16 is pressed against the base of the recess 5 during all possible joint movements and the ends contact the upper edge of the openings 7.

Figure 9:
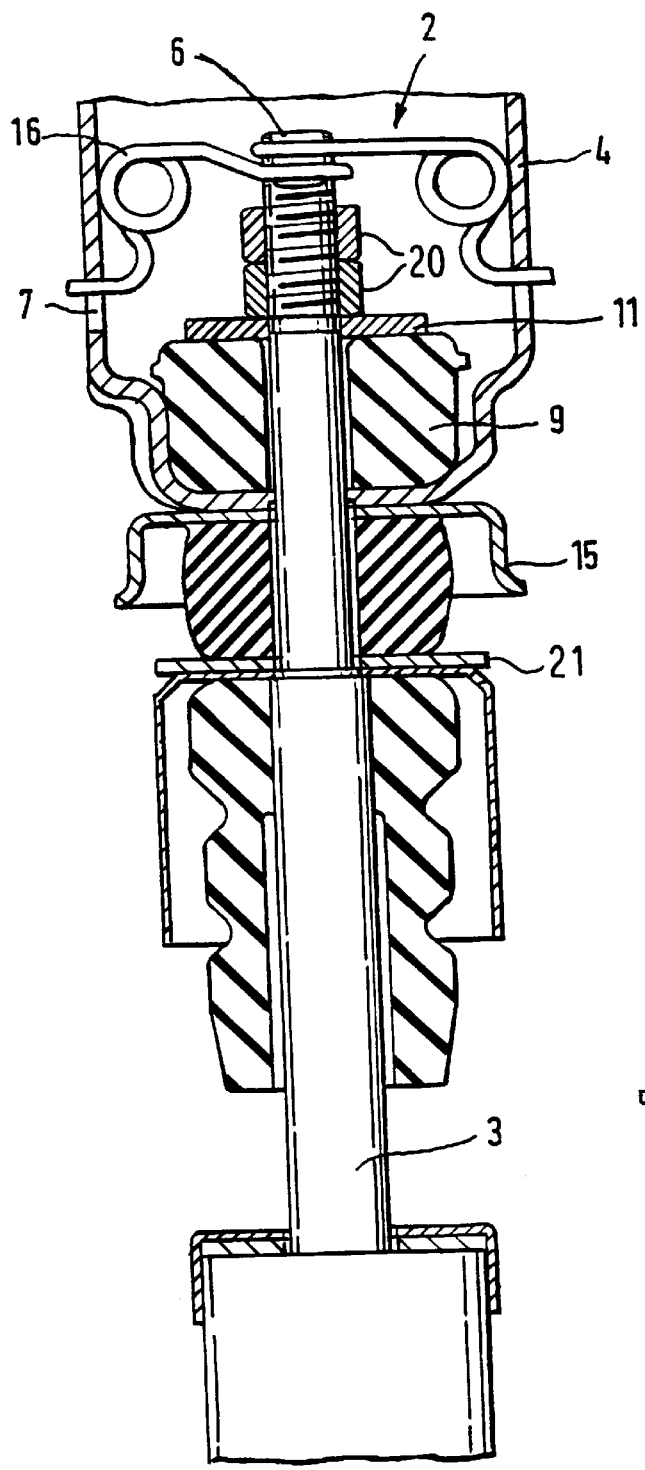
FIG. 9 shows another embodiment of the arrangment for securing against rotation comprising spring-steel wire.
Figure 10:
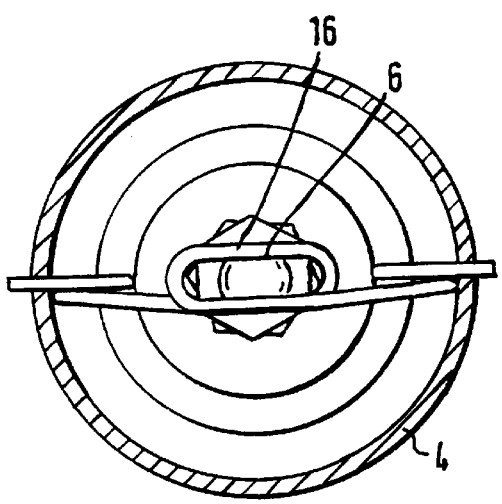
FIG. 10 is a top view of FIG. 9.

The embodiment shown in FIGS. 9 and 10 differs from that shown in FIGS. 7 and 8 in that the spring-steel wire 16 is wound centrally in such a way that a connection is formed with the key face 6 at the end of the pivot pin such that the wire 6 is fixed with respect to rotation relative thereto. A spring winding is provided between the outer ends and the center of the spring-steel wire 16 which facilitates assembly when introducing the ends of the spring steel into the openings 7.

The embodiments, described in the preceding relate to an arrangment for securing against rotation for piston rods of vibration dampers or shock absorber legs relative to a part 4 that is fixed with respect to the vehicle. Of course, such an arrangement for securing against rotation can also readily be used in pin type pivot bearings of vibration dampers or spring leg cylinders and receptacles.

The invention is not limited by the embodiments described above which are presented as examples only but can be modified in various ways within the scope of protection defined by the appended patent claims.

We claim:

1. An arrangement for securing against rotation in a structural component part of one of a hydraulic unit, hydropneumatic unit and a pneumatic unit for a motor vehicle having a body, the arrangement for securing against rotation comprising:

a piston rod connectable with the vehicle body;

a part adapted to be fixed with respect to the vehicle; and a flexible structural component part configured to participate in articulated movement and arranged so as to positioned between the piston rod and the part which is adapted to be fixed with respect to the vehicle so as to prevent rotation of the component part, at least one opening being formed in the fixed part, the flexible structural component part being configured to be engagable in one of a recess and key face arranged in the piston rod and so as to snap into the at least one opening in the fixed part such that the flexible structural component part is pretensioned axially.

2. An arrangement for securing against rotation according to claim 1, wherein the flexible structural component part is a molded spring-steel part having an outer circumference with at least one projection configured to engage in the at least one opening of the part that is fixed with respect to the vehicle.

3. An arrangement for securing against rotation in a structural component part of one of a hydraulic unit, hydropneumatic unit and a pneumatic unit for a motor vehicle having a body, the arrangement for securing against rotation comprising:

a piston rod connectable with the vehicle body;

a part adapted to be fixed with respect to the vehicle, and a flexible structural component part configured to participate in articulated movements and arranged so as to be positioned between the piston rod and the part which is adapted to be fixed with respect to the vehicle so as to prevent rotation of the component part, the flexible structural component part being a spatially wound spring-steel wire connected with the piston rod so as to be fixed with respect to rotation relative to the piston rod and further connected with the part which is fixed with respect to the vehicle.

* * * * *